2,698,866

1,1-BIS-(2-HYDROXY-3,5,6-TRICHLOROPHENYL)-2,2,2-TRICHLOROETHANE

John W. Churchill, Kenmore, N. Y., assignor to Olin Mathieson Chemical Corporation, a corporation of Virginia No Drawing. Application January 3, 1952, Serial No. 264,847

1 Claim. (Cl. 260—619)

My invention relates to 1,1-bis (2 hydroxy-3,5,6-trichlorophenyl) - 2,2,2 - trichloroethane as a novel composition of matter and to its utilization as a fungicide, insecticide and miticide. The 1,1-bis-(2-hydroxy-3,5,6-trichlorophenyl)-2,2,2-trichloroethane of my invention is obtained by reacting 2,4,5-trichlorophenol with chloral in the presence of aluminum chloride in carbon tetrachloride. Analysis indicates that the probable formula of my novel composition is

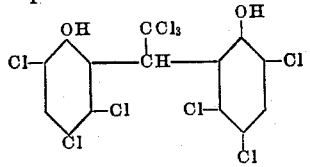

The novel composition possesses a high degree of activity against a wide variety of common pests. It may be utilized for example to control the activity of fungi, insects, and mites on plant life by applying to the plant a composition comprising 1,1-bis-(2-hydroxy-3,5,6-trichlorophenyl)-2,2,2-trichloroethane in very dilute concentrations. Suitable dilutents, which may be pesticidally active or inactive, include inert clays, elemental sulfur, water, hydrocarbons and other common carriers and dispersants. In general, my new composition may be applied by spraying or dusting. A particularly advantageous form of application of my novel composition to plant surfaces, however, is in dry form compounded with conventional diluents or other active ingredients to form dusts or powders. For example, my novel composition may be admixed with powdered carriers such as talc, pyrophyllite, gypsum, chalk, fuller's earth, kieselguhr, kaolin and china clay.

The preparation and pesticidal activity of my novel composition will be further illustrated by reference to the following examples.

Example I 1,1 - bis - (2 - hydroxy - 3,5,6 - trichlorophenyl) - 2,2,2-trichloroethane was prepared by mixing 39.5 grams (0.2 mole) of 2,4,5-trichlorophenol, 14.7 grams (0.1 mole) of chloral and 39 grams (0.3 mole) of aluminum chloride in 250 ml. of carbon tetrachloride. The mixture was allowed to stand at room temperature for 1.5 hours and refluxed for 3 hours. Water was added slowly with cooling to decompose the reaction mixture and the solid which separated was removed by filtration and recrystallized from carbon tetrachloride. This 1,1-bis-(2-hydroxy-3,5,6-trichlorophenyl)-2,2,2-trichloroethane product was a white powder and had a melting point of 161°–162° C. It contained 60.66% chlorine as compared with a calculated value of 60.9%.

Example II 1,1 -bis - (2 - hydroxy - 3,5,6 - trichlorophenyl) - 2,2,2-trichloroethane was tested for inhibition of spore germination of treated spores of the plant pathogen, *Monilina fructicola*, a measure of its effectiveness against fungi. The test was conducted by incubating various dilutions of spores and of the compound to be tested in a nutrient medium for 24 hours at 20° C. The amount of inhibition is calculated from a count of the spores in the various test and control dilutions and is expressed as the ED–50 dose, i. e. the minimum dose in parts permillion resulting in 50% inhibition of germination. The ED–50 dose for my new composition of matter was 13 p. p. m. indicating that very low dilutions of the compound are effective in preventing spore germination and achieving excellent fungicidal results.

Example III

The insecticidal activity of 1,1-bis-(2-hydroxy-3,5,6-trichlorophenyl) - 2,2,2 - trichloroethane was tested by quantitative micro-injection of adult females of the German cockroach, *Blatella germanica*. The test chemical was made up in alcohol-hydrocarbon solutions having concentrations of about 5%. Injections were made directly into the body cavity of the insect in amounts of about 1.3 microliters by means of a tuberculin syringe fitted with a needle and actuated by a micrometer caliper head. Following injection, the roaches were placed in dishes with screened covers and provided with water vials. They were observed every 12 hours up to 72 hours at the end of which time the 1,1-bis-(2-hydroxy-3,5,6-trichlorophenyl)-2,2,2-trichloroethane had achieved a 100% knock-down.

Example IV 1,1 - bis - (2 - hydroxy - 3,5,6 - trichlorophenyl) -2,2,2-trichloroethane was then tested for insecticidal activity by noting the contact or stomach poison effects on the leaf-feeding larvae of the Mexican bean beetle, *Epilachna varivestis*. Cut, small (2-leaf) kidney bean plants were dipped in a 1% alcohol solution of 1,1-bis-(2-hydroxy-3,5,6-trichlorophenyl) - 2,2,2 - trichloroethane. When the leaf surfaces were drained dry, the plants were placed in dishes in such a manner that their stems remained in water. Ten beetle larvae, secondin star, were transferred to each plant and screen covered. The relative amounts of available food eaten during the test were noted as were phytotoxicity ratings. Observed mortality, recorded at 12, 24, 48 and 72 hours, was between 85 and 100%.

Example V 1,1 - bis - (2 - hydroxy - 3,5,6 - trichlorophenyl) - 2,2,2-trichloroethane was next tested for insecticidal activity by noting its contact or stomach poison effects on the leaf-feeding caterpillars of the southern armyworm, *Prodenia eridenia*. Cut, small (2-leaf) kidney bean plants were dipped in a 1% alcohol solution of 1,1-bis-(2-hydroxy-3,5,6 - trichlorophenyl) - 2,2,2 - trichloroethane. When the leaf surfaces were drained dry, the plants were placed in dishes in such a manner that their stems remained in water. Ten caterpillars were transferred to each plant and screen covered. The relative amounts of available food eaten during the test were noted as were phytotoxicity ratings. Observed mortality, recorded at 12, 24, 48 and 72 hours was between 80% and 100%.

Example VI 1,1 - bis - (2 - hydroxy - 3,5,6 - trichlorophenyl) - 2,2,2-trichloroethane was tested for miticidal activity by noting its contact effects (by direct dipping) and contact residue effects on a plant-sucking pest, the two-spotted spider mite, *Tetranychus bimaculatus*. Mite infested young bean plants as well as uninfested bean plants were immersed in a 1% alcohol solution of 1,1-bis-(2-hydroxy-3,5,6-trichlorophenyl)-2,2,2-trichloroethane. After drying, the bean plants were supported and their stems immersed in water-filled bottles. A portion of the treated uninfested plants was inoculated with leaf portions from a badly infested but untreated plant to test residual toxicity. The mortality against the two-spotted spider mite by both contact and residual methods of determination was 100%.

Example VII 1,1 -bis - (2 - hydroxy - 3,5,6 - trichlorophenyl) - 2,2,2-trichloroethane was tested for contact and fumigant effects on the adults of a stored pest, the granary weevil, *Sitophilus granarius*. Filter paper circles were soaked in a 1% alcohol solution, drained, and transferred to plastic dishes where they were allowed to air-dry. Twenty adult weevils were added to each dish and the dishes covered. The mortality against the granary weevil was 0–25%.

I claim:

As a composition of matter, 1,1-bis-(2-hydroxy-3,5,6-trichlorophenyl)-2,2,2-trichloroethane.

References Cited in the file of this patent

UNITED STATES PATENTS 1,707,181    Weiler et al. _____ Mar. 26, 1929